(12) United States Patent
Arvanites (10) Patent No.: US 7,766,357 B2
(45) Date of Patent: Aug. 3, 2010

(54) STEP ASSEMBLY FOR USE WITH A VEHICLE

(75) Inventor: Margherita Arvanites, 15131 E. Palisades Blvd., Fountain Hills, AZ (US) 85268

(73) Assignee: Margherita Arvanites, Fountain Hills, AZ (US)

( * ) Notice: Subject to any disclaimer, the term of this patent is extended or adjusted under 35 U.S.C. 154(b) by 299 days.

(21) Appl. No.: 12/057,153

(22) Filed: Mar. 27, 2008

(65) Prior Publication Data
US 2009/0243249 A1   Oct. 1, 2009

(51) Int. Cl.
*B60R 3/02* (2006.01)

(52) U.S. Cl. .................. 280/166; 296/62; 280/164.1; 182/127; 182/156

(58) Field of Classification Search ......... 280/163–169; 296/62; 182/127, 156
See application file for complete search history.

(56) References Cited

U.S. PATENT DOCUMENTS

| | | | |
|---|---|---|---|
| 2,544,799 A | | 3/1951 | McCann |
| 3,462,170 A | * | 8/1969 | Smith et al. .................. 280/166 |
| 3,756,622 A | | 9/1973 | Pyle et al. |
| 3,853,369 A | | 12/1974 | Holden |
| 3,889,997 A | | 6/1975 | Schoneck |
| 3,961,809 A | | 6/1976 | Clugston |
| 4,194,754 A | | 3/1980 | Hightower |
| 4,720,116 A | * | 1/1988 | Williams et al. ............. 280/166 |
| 4,733,752 A | * | 3/1988 | Sklar ............................ 182/86 |
| 5,397,143 A | | 3/1995 | Bird |
| 5,505,476 A | | 4/1996 | Maccabee |
| 5,941,342 A | | 8/1999 | Lee |
| 5,944,332 A | * | 8/1999 | Lee et al. ..................... 280/163 |
| 6,026,933 A | * | 2/2000 | King et al. ................... 182/165 |
| 6,471,002 B1 | | 10/2002 | Weinerman |
| 6,511,086 B2 | | 1/2003 | Schlicht |
| 6,554,311 B1 | | 4/2003 | Blankenship et al. |
| 6,682,086 B1 | | 1/2004 | Erickson |
| 6,685,204 B1 | * | 2/2004 | Hehr .......................... 280/166 |
| 6,769,704 B2 | | 8/2004 | Cipolla |
| 6,971,663 B1 | | 12/2005 | Blake |
| 6,994,362 B2 | | 2/2006 | Foster |
| 7,114,736 B2 | | 10/2006 | Stodola et al. |
| 7,168,722 B1 | | 1/2007 | Piotrowski et al. |
| 7,185,904 B1 | | 3/2007 | Jones et al. |
| 7,195,262 B2 | * | 3/2007 | Chaudoin et al. ........... 280/166 |
| 7,240,947 B2 | | 7/2007 | Kuznarik et al. |
| 7,261,357 B1 | * | 8/2007 | Bechen ....................... 296/62 |
| 2006/0170179 A1 | | 8/2006 | Dahl |
| 2006/0214391 A1 | | 9/2006 | Columbia |

* cited by examiner

*Primary Examiner*—S. Joseph Morano
*Assistant Examiner*—Erez Gurari
(74) *Attorney, Agent, or Firm*—Mathew R. P. Perrone, Jr.; Brie A. Crawford (57) ABSTRACT

A step assembly is easily mounted on the trailer hitch of a vehicle, and easily folded to a closed position or unfolded to an open position in place on the vehicle or off of the vehicle. In the open position, a person or a pet can more easily enter or leave a vehicle. In the closed position, the step assembly is more easily stored.

10 Claims, 10 Drawing Sheets

STEP ASSEMBLY FOR USE WITH A VEHICLE

This invention relates to a step assembly for use with a vehicle and more particularly to a step assembly for use with a vehicle, which may be mounted at the trailer hitch of a vehicle, and folded up as desired for storage or folded down as desired for use.

BACKGROUND OF THE INVENTION

When an animal owner is required to transport a domestic animal in a vehicle, assistance is sometimes required to get the animal into the vehicle. For example, some dogs or cats are too large to be lifted and placed in a vehicle. The structure of the vehicle can make it difficult for the animal to climb into the vehicle. Also, an animal may not like assistance. If the animal can act on its own, advantages can be obtained.

As a result, many devices are known for allegedly facilitating such procedures by an animal. These devices tend to be bulky and clumsy. To overcome that factor, collapsible devices are now known. But these devices lack the strength or durability, and ease of use, that is most desirable.

Furthermore, such devices which help the animal get into the vehicle, tend to interfere with the use and the enjoyment of the vehicle. For example, storage of the device may be a problem. So it is very desirable to find or develop a device which aids the animal in its efforts to get into the vehicle without drastically interfering with the owner's enjoyment of the vehicle.

This desirability also applies to a person. An effective step assembly can be convenient for a person to use. It can facilitate a person entering or leaving a vehicle.

With respect to the class of vehicle known as a pickup truck, it is sometimes necessary for a person as well an animal to climb therein, especially into the bed thereof. To that end, a stepping device can be very useful. Yet, such a device must not interfere with the use of the vehicle and other functions thereof.

SUMMARY OF THE INVENTION

Among the many objectives of this invention is the provision of a collapsible step assembly, which may be attached to or removed from a vehicle as desired.

A further objective of this invention is the provision of a collapsible step assembly, which is easily folded.

Yet a further objective of this invention is the provision of a strong collapsible step assembly, which is minimizes interference with vehicle use.

A still further objective of this invention is the provision of a collapsible step assembly, which is easily transported.

Another objective of this invention is the provision of a collapsible step assembly, which is easily adjustable.

Yet another objective of this invention is the provision of a collapsible step assembly, which minimizes interference with the use of a vehicle to which it is attached.

Still another objective of this invention is the provision of a collapsible step assembly, which permits a person to enter a vehicle more easily.

Also, an objective of this invention is the provision of a collapsible step assembly, which permits a pet or an animal to enter a vehicle more easily.

A further objective of this invention is the provision of a collapsible step assembly, which permits a pet or animal to leave a vehicle more easily.

Also, an objective of this invention is the provision of a collapsible step assembly, which permits a person to leave a vehicle more easily.

These and other objectives of the invention (which other objectives become clear by consideration of the specification, claims and drawings as a whole) are met by providing a step assembly, which is easily mounted on the trailer hitch of a vehicle, and easily folded to a closed position or unfolded to an open position in place on the vehicle or off of the vehicle, to facilitate a person or pet in the entry of or leaving of a vehicle.

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

A step assembly to assist the entry into or exit from a vehicle is attached to the vehicle through the cooperation of a mounting means therefor and the trailer hitch, thereon. This step assembly is usable by humans or pets. The step assembly is foldable or collapsible as desired. It may even be folded while on the vehicle, to facilitate use thereof. This step assembly offers two or three steps, which facilitate entry into a vehicle. The step assembly may be a double step assembly with two steps or a triple step assembly with three steps.

Figure 1:
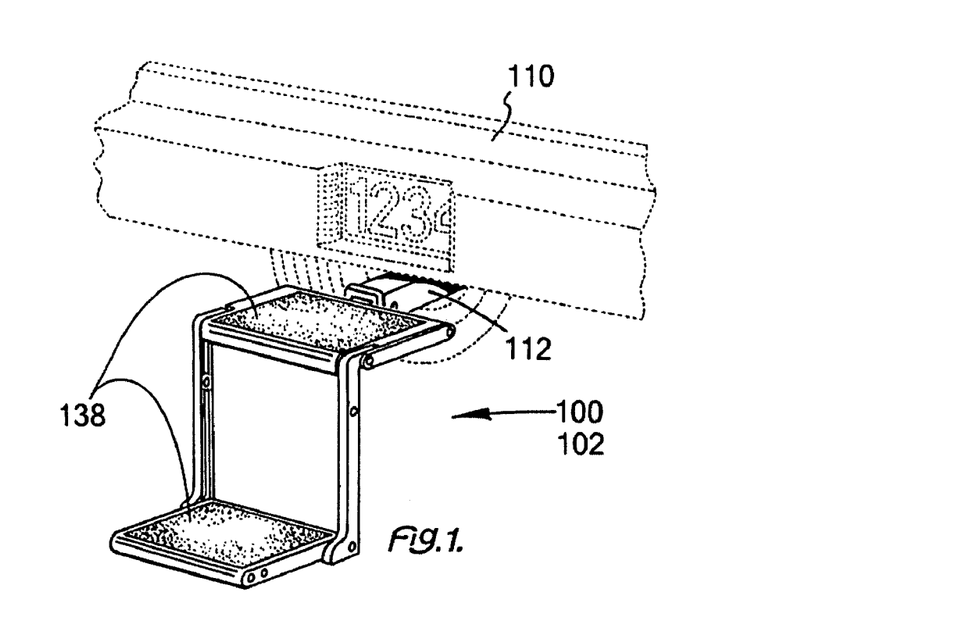
FIG. 1 depicts a perspective view of the double step assembly 100 in open position 102 on vehicle 110 of this invention.
Figure 2:
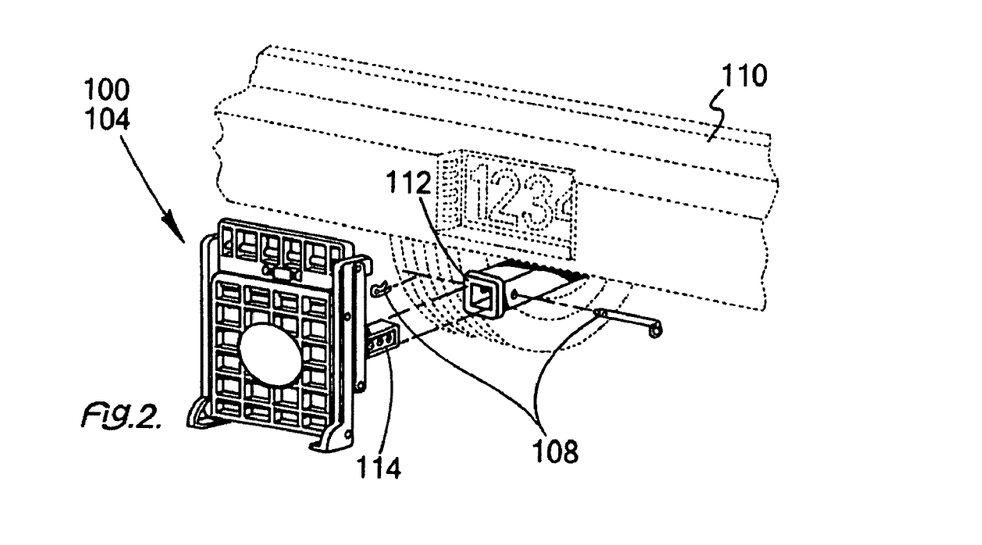
FIG. 2 depicts a perspective view of the double step assembly 100 in closed position 104 on vehicle 110 of this invention, based on FIG. 1.

In FIG. 1 and FIG. 2, double step assembly 100 fits onto vehicle 110 at trailer hitch 112. FIG. 1 has double step assembly 100 and open position 102 and may include an optional non slip surface 138. In this manner, a person or an animal may use double step assembly 100. With double step assembly 100 in closed position 104 as in FIG. 2, it may be left on the vehicle 110 and not interfere with the use of the vehicle 110.

Still considering FIG. 2, hitch insert 114 on double step assembly 100 slides into trailer hitch 112. The hitch insert 114 is then secured therein by bar and cotterpin assembly 108. Thus, double step assembly 100 becomes releasably and strongly mounted on vehicle 110.

Figure 3:
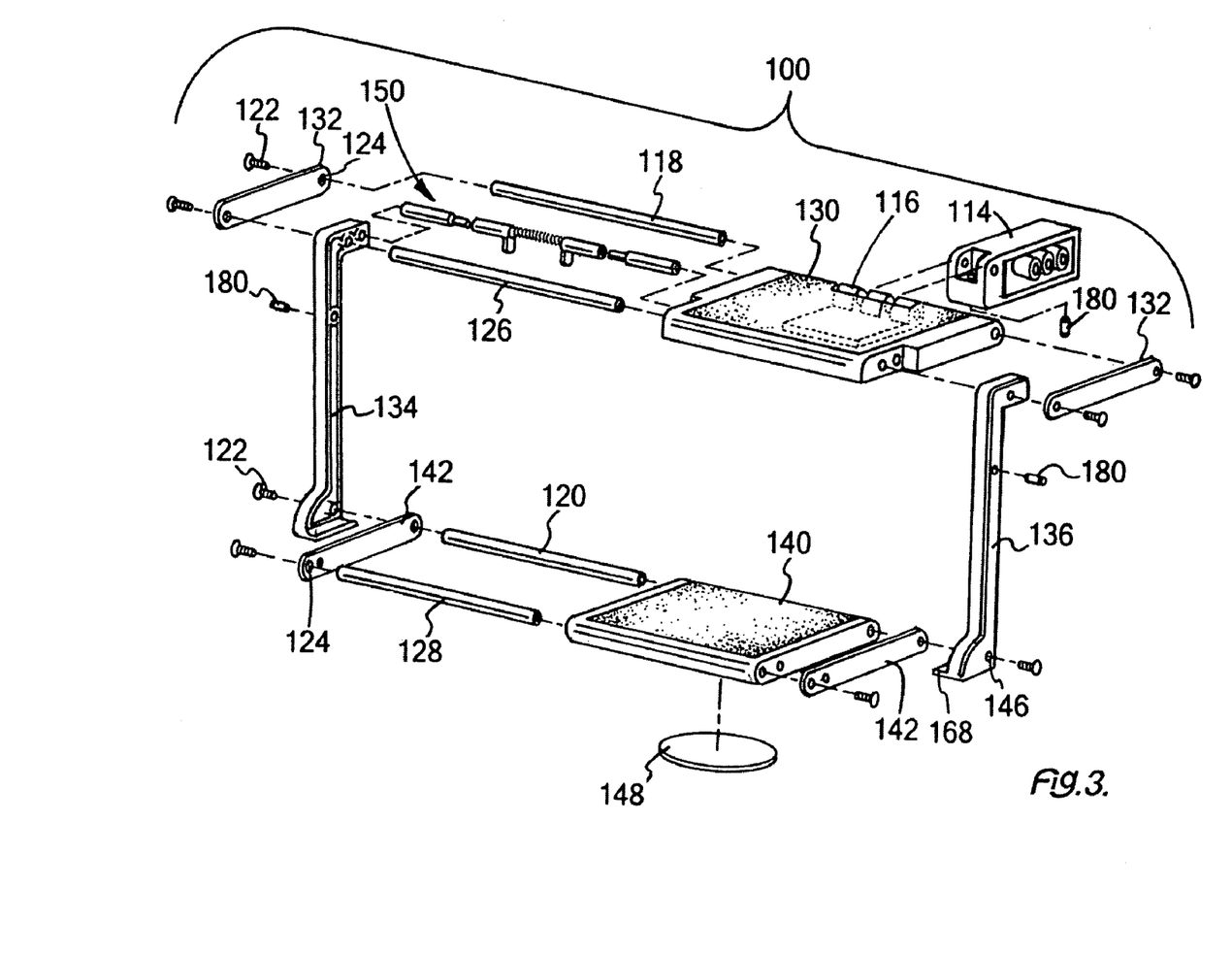
FIG. 3 depicts an exploded, perspective view of the double step assembly 100 of this invention.

Referring now to FIG. 3, the structure of the double step assembly 100 becomes more clear. Hitch insert 114 of the double step assembly 100 is secured thereto by top hinge 116 and first upper hinge rod 118, which creates a pivotal connection, which in turn is secured through fasteners 122. While first upper hinge rod 118 cooperates with top step 130, first lower hinge rods 120 use fasteners 122 to cooperate with bottom step 140.

Cooperating with top step 130 are a pair of upper side plates 132, on opposing sides thereof and roughly parallel to the hitch insert 114. Between one upper side plate 132 and top step 130 is the left vertical support 134. On the opposing side thereof, right vertical support 136 is between the upper side plate 132 and top step 130.

While top step 130 is secured to the upper end of each of the left vertical support 134 and the right vertical support 136, bottom step 140 is secured to the lower end thereof to in similar fashion with a pair of bottom side plates 142. However, each of the left vertical support 134 and the right vertical support 136 secure each bottom side plate 142 between it and bottom step 140.

For further stability, second upper hinge rod 126 attaches to the left and right vertical supports 134 and 136 and the top step. Second lower hinge rod 128 attaches to the lower end of the left and right vertical supports 134 and 136 and the bottom steps 140.

Both the left vertical support 134 and the right vertical support 136 include support apertures 146 as desired to receive hinge rods or other mounting devices. Lower support plates 168 are also present at the bottom of left vertical support 134 and the right vertical support 136 to provide further step support.

Both the left vertical support 134 and the right vertical support 136 include lever lock assembly 150 and ball lock assembly 180 which provide for positioning the double step assembly 100 in the open position 102 or the closed position 104 as desired. It is also possible to provide top step 130 and bottom step 140 with a non-slip surface 138 (FIG. 1). Additionally, a logo plate 148 may be secured to either top step 130 or bottom step 140 as desired. Logo plate 148 may be any appropriate decoration or advertising on double step assembly 100.

Figure 4:
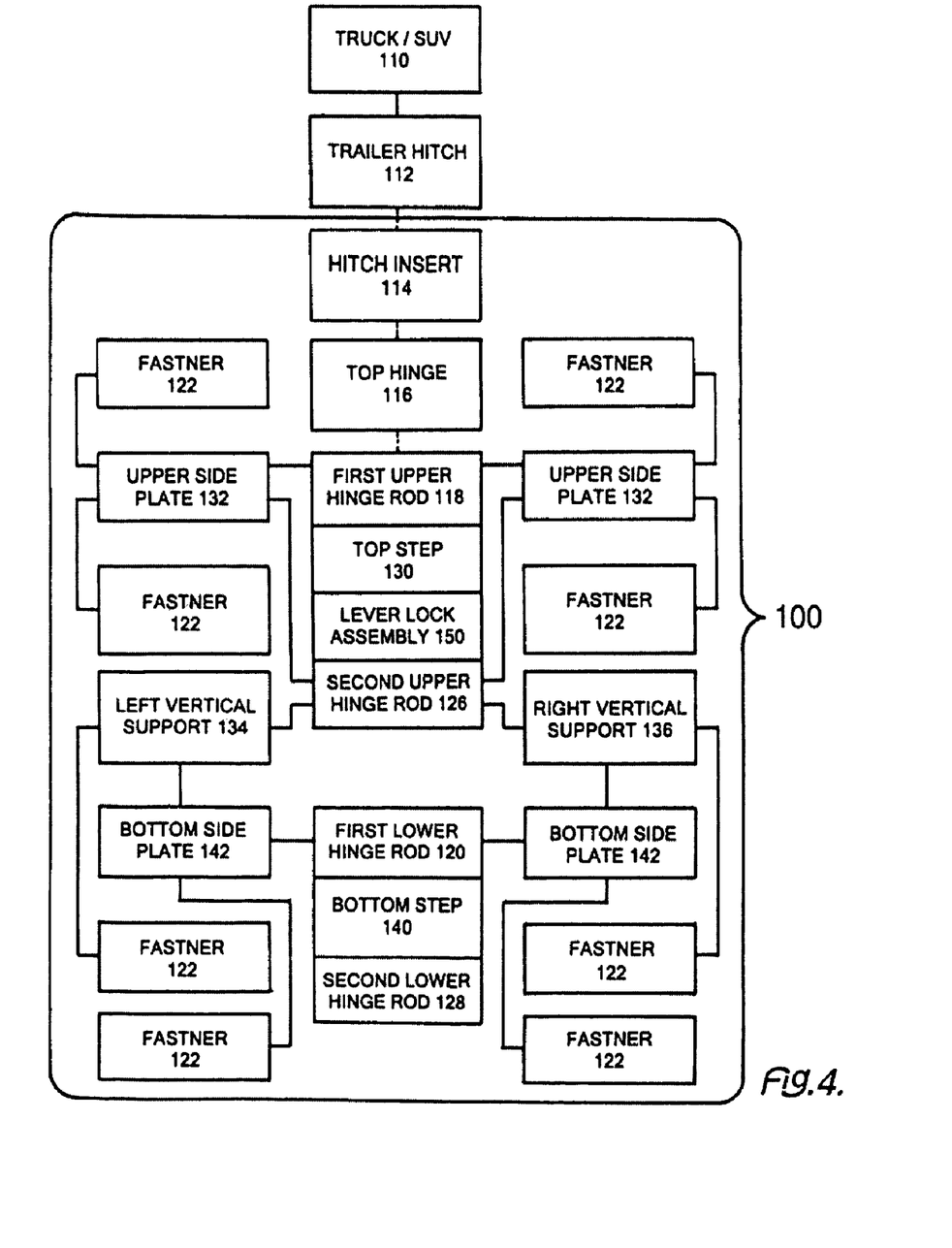
FIG. 4 depicts a block diagram for the double step assembly 100 of this invention.

With FIG. 4, the double step assembly 100 is both expanded and further clarified. Double step assembly 100 is inserted into trailer hitch 112 of vehicle 110 at hitch insert 114. The first upper hinge rod 118 connects top hinge 116, which is secured with top step 130, to hitch insert 114. First upper hinge rod 118 slides into the top step 130 at and through top hinge 116. Since first upper hinge rod 118 is hollow, a fastener 122 passes through upper side plate 132 and into first upper hinge rod 118 at each end thereof.

The upper side plate 132 also receives second upper hinge rod 126 into the opposite side of top step 130. Second upper hinge rod 126 also receives left vertical support 134 and right vertical support 136 on opposing sides of top step 130. Then fasteners 122 secure each upper side plate 132 thereto. Thus, second upper hinge rod 126 and first upper hinge rod 118 secure opposing ends of both of upper side plate 132. Lever lock assembly 150 fits into top step 130 adjacent to second upper hinge rod 126 and facilitates the moving of double step assembly 100 between open position 102 and closed position 104.

For bottom step 140, second lower hinge rod 128 and first lower hinge rod 120 use fasteners 122 with bottom side plate 142 through bottom plate apertures 124 (FIG. 3) therein in order to secure bottom side plates 142 to bottom step 140. However, with first lower hinge rod 120, left vertical support 134 and right vertical support 136 are positioned over bottom side plate 142 before fasteners 122 are secured therein.

Figure 5:
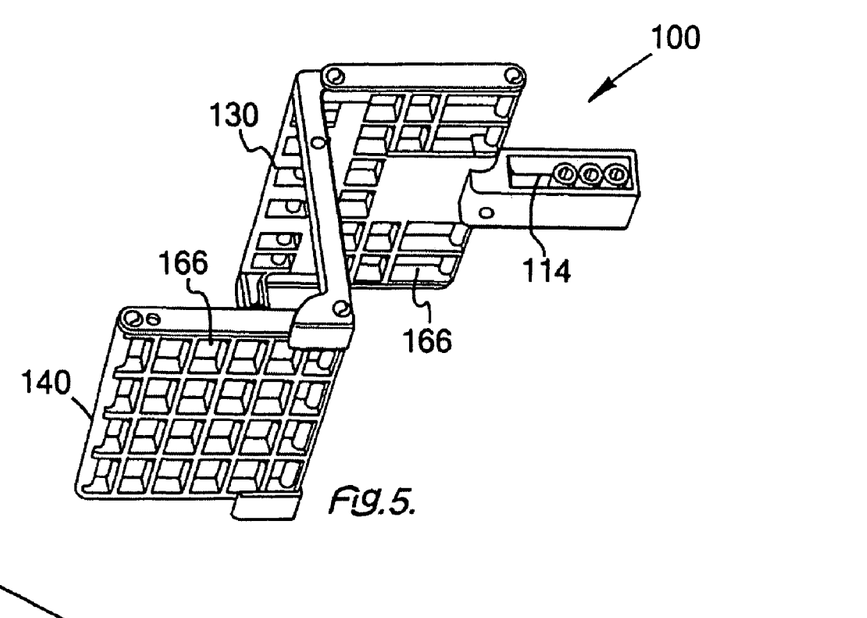
FIG. 5 depicts a bottom perspective view of the double step assembly 100 in open position 102 of this invention.

With FIG. 5, strength of the step assembly 100 is improved. A honey comb type structure 166 strengthens the step assembly 100 and is shown in top step 130 and bottom step 140. It also reduces the weight of the step assembly, while substantially maintaining strength. Strength or weight support may also be increased thereby.

Figure 6:
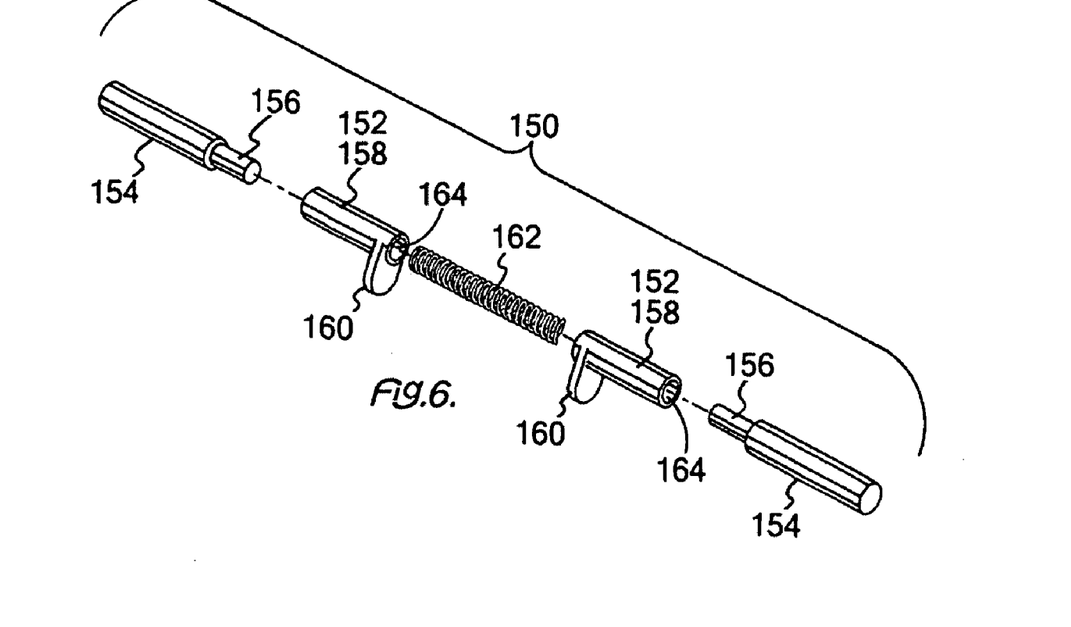
FIG. 6 depicts an exploded, perspective view of a lever lock assembly 150 for double step assembly 100 of this invention.
Figure 7:
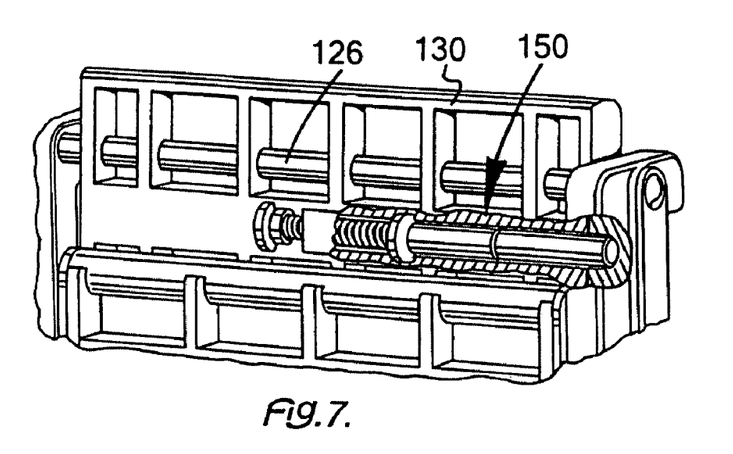
FIG. 7 depicts a perspective view of a ball lock assembly 180 for lever lock assembly 150 mounted on double step assembly 100 of this invention.
Figure 8:
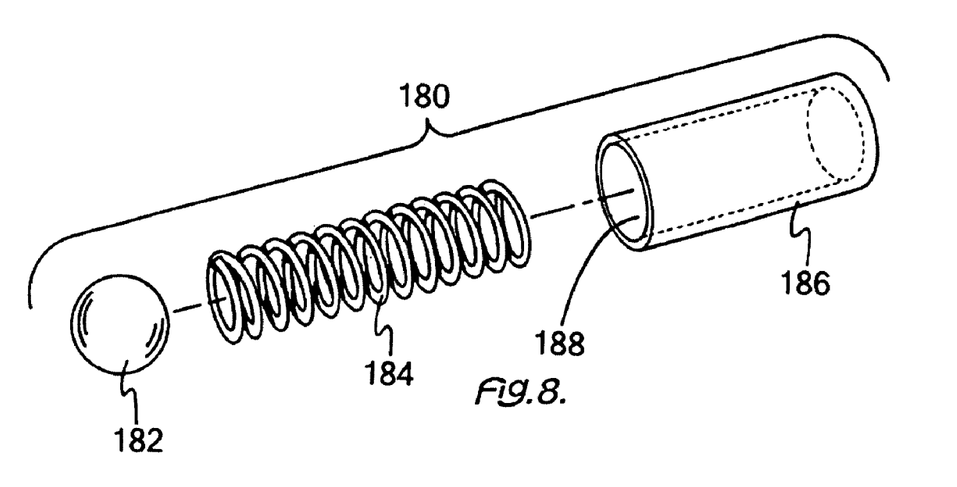
FIG. 8 depicts an exploded, perspective view of a ball lock assembly 180 for double step assembly 100 of this invention.
Figure 9:
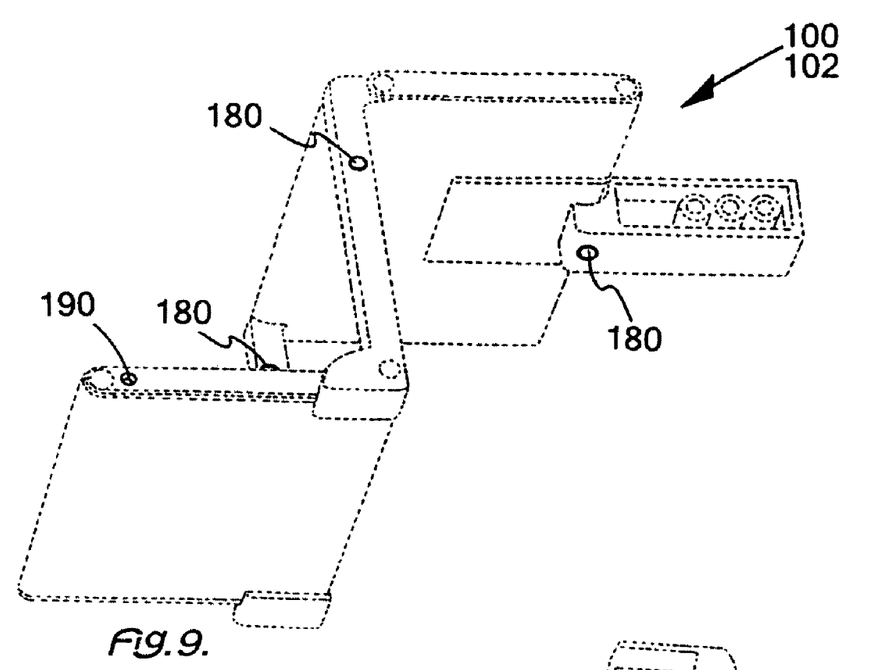
FIG. 9 depicts a bottom perspective view of a ball lock assembly 180 for lever lock assembly 150 with double step assembly 100 of this invention in phantom.
Figure 10:
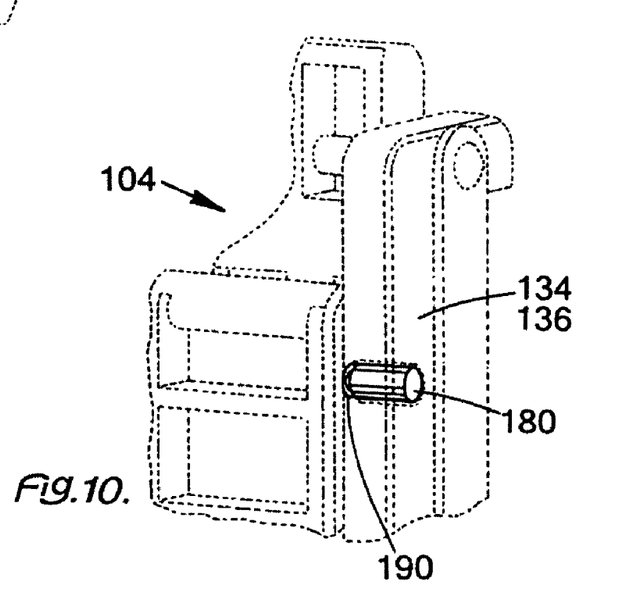
FIG. 10 depicts a side perspective view of a ball lock assembly 180 with double step assembly 100 of this invention in closed position 104.
Figure 11:
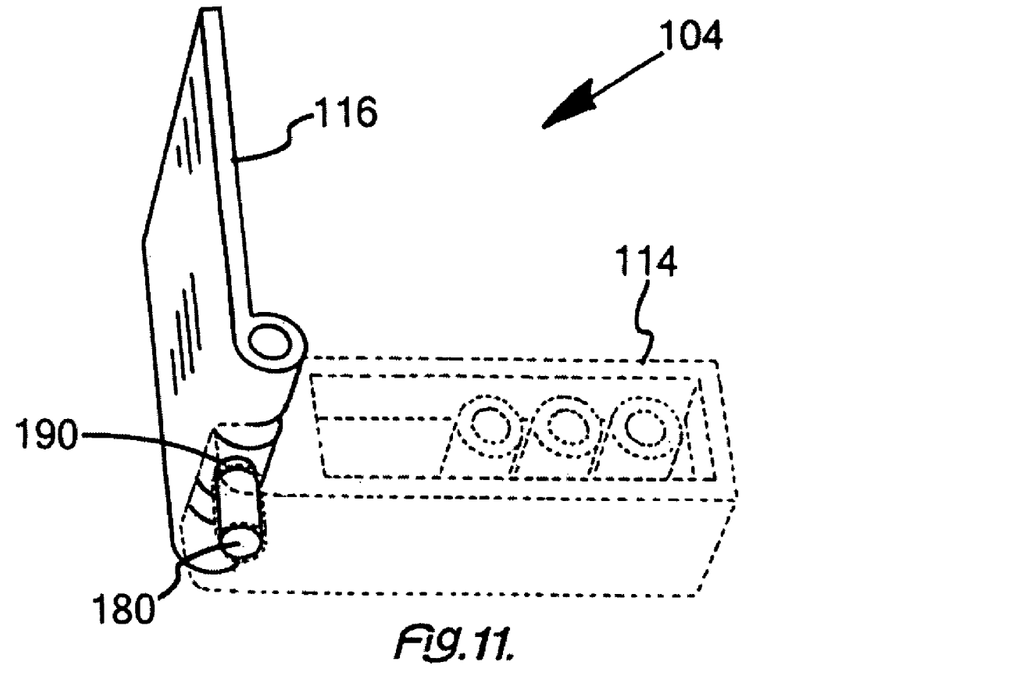
FIG. 11 depicts a bottom perspective view of a ball lock assembly 180 with double step assembly 100 of this invention in closed position 104.
Figure 12:
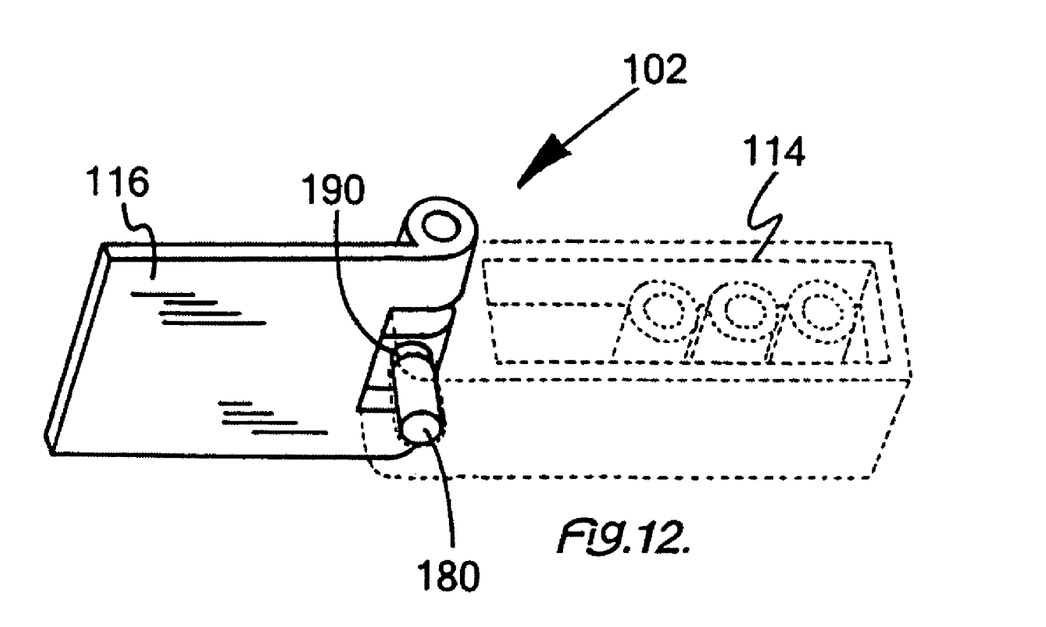
FIG. 12 depicts a bottom perspective view of a ball lock assembly 180 with double step assembly 100 of this invention in open position 102.
Figure 13:
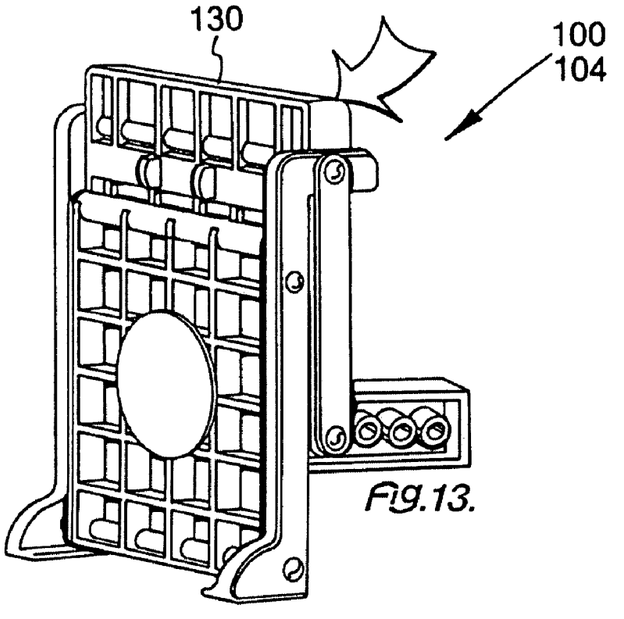
FIG. 13 depicts a perspective view of a ball lock assembly 180 with double step assembly 100 of this invention moving to open position 102.
Figure 14:
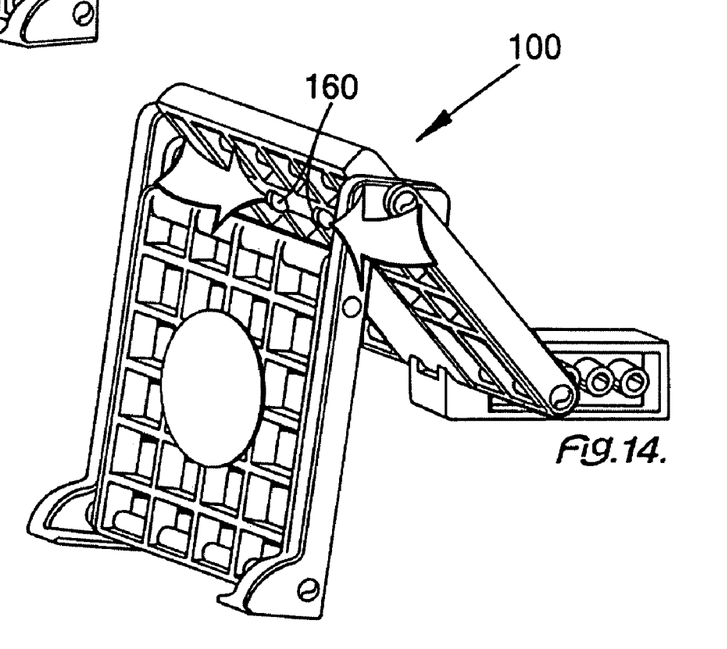
FIG. 14 depicts a second perspective view of a ball lock assembly 180 with double step assembly 100 of this invention moving to open position 102.
Figure 15:
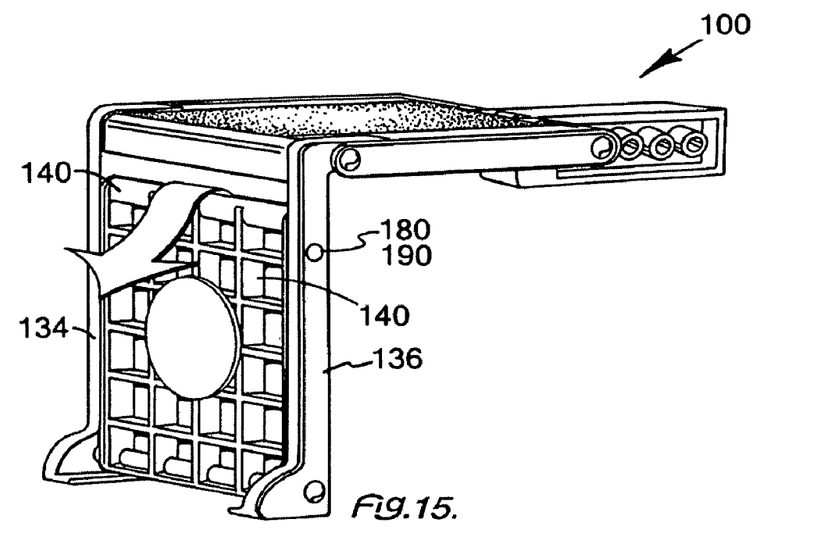
FIG. 15 depicts a perspective view of a ball lock assembly 180 with double step assembly 100 of this invention moving to open position 102.
Figure 16:
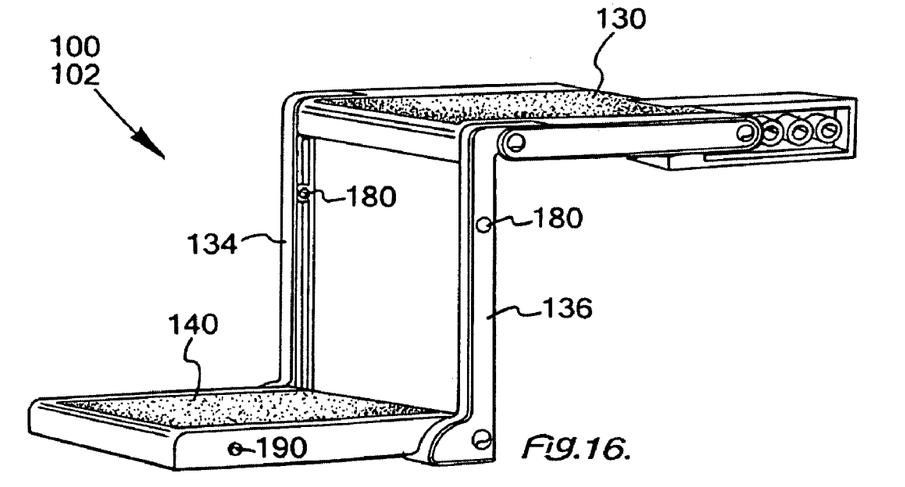
FIG. 16 depicts a top perspective view of a ball lock assembly 180 with double step assembly 100 of this invention in open position 102.

Adding FIG. 6, and FIG. 7 to the considerations, lever lock assembly 150 is explained more clearly as a mechanism facilitating the transfer between closed position 102 as shown and open position 104 (FIG. 14). Lever lock assembly 150 fits into top step 130 adjacent to second upper hinge rod 126. Spring cover 152 serves a dual purpose. First, spring cover 152 cooperates with the end latch bolt 154 of lever lock assembly 150 by virtue of the coupling shank 156 extending therefrom. Secondly, at one end, spring cover 152 serves as sliding bushing 158 and receives large compression spring 162.

Oppositely disposed from coupling shank 156, sliding bushing 158 has finger lever 160 extending therefrom to facilitate use thereof. Large compression spring 162 fits into coupling aperture 164 of sliding bushing 158. In lever lock assembly 150, a spring cover 152 appears on either end of the large compression spring 162, as does a sliding bushing 158 and coupling shank 156 of end latch bolt 154.

Adding FIG. 8, FIG. 9, FIG. 10, FIG. 11 and FIG. 12, ball lock assembly 180 holds double step assembly 100 in open position 102 or closed position 104 as desired. Ball lock assembly 180 has a reciprocating ball 182 communicating with a small compression spring 184 within a housing 186, with a housing aperture 188.

A ball lock assembly 180 is mounted in each of left vertical support 134 and right vertical support 136. Small compression spring 184 then holds reciprocating ball 182 in blind aperture or dimple 190 on a side of bottom step 140. Likewise, hinge 116 is indexed with hitch insert 114.

With FIG. 13, FIG. 14, FIG. 15, FIG. 16 and FIG. 17, the steps of folding to closed position 104 (FIG. 13) or unfolding to open position 102 (FIG. 16) are further clarified. Pressure on bottom step 140 releases ball lock assembly 180 from dimple 190 and permits folding to take place. As double step assembly 100 folds, each reciprocating ball 182 is allowed enter a second dimple 190 on left vertical support 134 and right vertical support 136, thereby holding bottom step 140 in place.

Whether in closed position 104 (FIG. 13) or open position 102 (FIG. 16), multiple mount adjustment 196 may be used to secure double step assembly 100 to vehicle 110. Finger lever 160 (FIG. 14) releases closed position 104 of left vertical support 134 and right vertical 136 from top step 130. The hitch insert 114 can have a multiple mount adjustment 196 (FIG. 17).

Figures 17, 18:
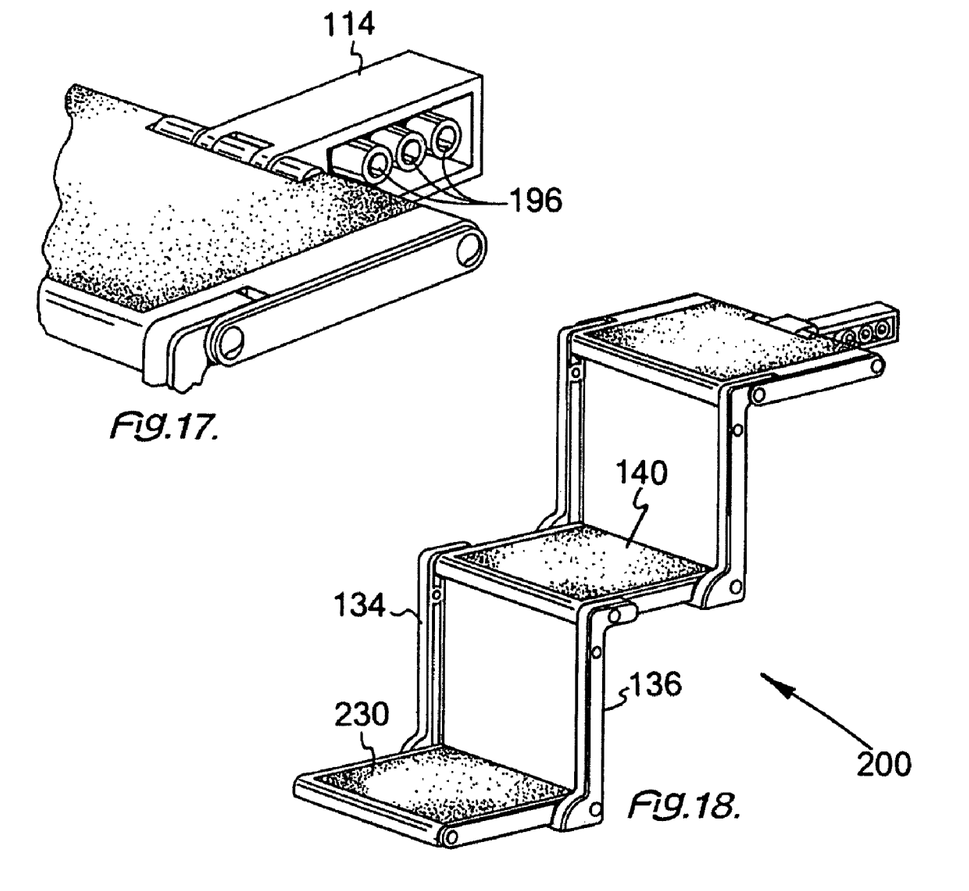
FIG. 17 depicts a perspective view of with double step assembly 100 of this invention with a mounting adjustment 196.
FIG. 18 depicts a perspective view of triple step assembly 200 of this invention moving in open position 102.

With the consideration of FIG. 18, the feasibility of triple step assembly 200 with third step 230 becomes clear in order to form. A second set of left vertical support 134 and right vertical support 136 support third step 230 below bottom step 140, with a structure and folding capability similar to bottom step 140. Thus, third step 230 may be added with very little increase bulk for triple step assembly 200 relative to double step assembly 100.

Figure 19:
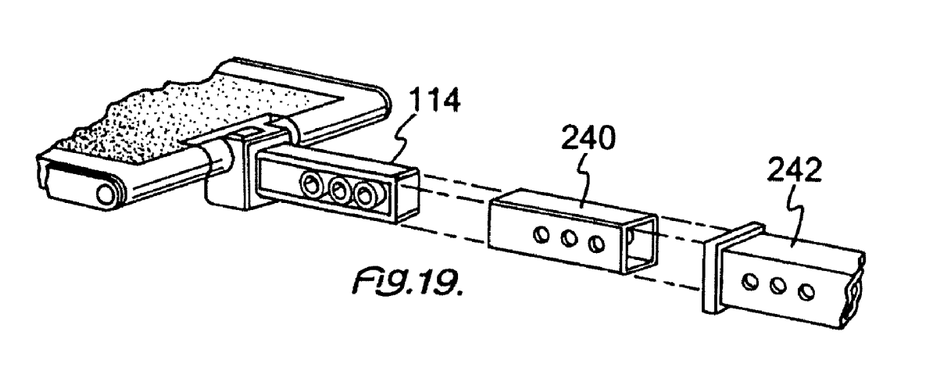
FIG. 19 depicts a perspective view of large hitch 242, which is usable with double step assembly 100 or triple step assembly 200 of this invention.

FIG. 19 shows a hitch sleeve 240 usable with a large trailer hitch 242 and applicable both to triple step assembly 200 and to double step assembly 100. Hitch sleeve 240 adjusts so that hitch insert 114 fits efficiently into large trailer hitch 242. Two of bar and cotterpin assembly 108 (FIG. 2) are used to complete the assembly.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A collapsible step assembly comprising:
    a mounting means being receivable by a trailer hitch;
    the mounting means supporting the collapsible step assembly;
    at least two collapsible steps for the collapsible step assembly communicating with the mounting means;
    the at least two collapsible steps being movable from a closed position to an open position, and from the open position to the closed position;
    the at least two collapsible steps including a top step and a bottom step;
    the mounting means including a first part of a top hinge;
    the top step including a second part of the top hinge;
    a left vertical support and a right vertical support connecting the top step to the bottom step;
    a first upper hinge rod connecting the first part of the top hinge and the second part of the top hinge;
    a top first side plate and a top second side plate being connected to opposing sides of the top step;
    a bottom first side plate and a bottom second side plate being connected to opposing sides of the bottom step;
    a first lower hinge rod connecting the bottom first side plate and the bottom second side plate to the bottom step;
    a first upper hinge rod connecting the first top side plate and the second top side plate to the top step;
    a second upper hinge rod connecting the left vertical support and the right vertical support to the top step;
    the second upper hinge rod connecting the first top side plate over the left vertical support to the top step and connecting the second top side plate over the right vertical support to the top step on opposing sides thereof;
    a first lower hinge rod connecting the left vertical support over a first bottom side plate to the bottom step at a lower end thereof;
    the first lower hinge rod connecting the right vertical support over a second bottom side plate to the bottom step at the lower end thereof;
    the first lower hinge rod connecting the left vertical support and the first bottom side plate to the bottom step;
    the first bottom side plate being between the left vertical support and the bottom step;
    the first lower hinge rod connecting the right vertical support and the second bottom side plate to the bottom step;
    the second bottom side plate being between the right vertical support and the bottom step;
    a fastener holding each end of the first upper hinge rod, the second upper hinge rod, the first lower hinge rod and the second lower hinge rod in a desired position;
    a lever lock assembly and a ball lock assembly cooperating with the left vertical support and the right vertical support in order to provide for positioning the collapsible step;
    the lever lock assembly fitting into the top step adjacent to the second upper hinge rod;
    a centrally located spring with a spring cover for the lever lock assembly;
    the spring cover cooperating with a coupling shank on each side thereof;
    each coupling shank cooperating with an end latch bolt of the lever lock assembly; and
    a sliding bushing operably connecting to the spring in order to facilitate an opening and a closing of the step assembly.

2. The collapsible step assembly of claim 1 further comprising:
    a) the sliding bushing having a finger lever extending therefrom to facilitate use thereof;
    b) the sliding bushing having a coupling aperture;
    c) the coupling aperture receiving a large compression spring; and
    d) the ball lock assembly cooperating with the lever lock assembly.

3. The collapsible step assembly of claim 2 further comprising:
    a) the ball lock assembly holding the step assembly in the open position or the closed position;

b) the ball lock assembly having a ball housing;
c) the ball housing containing a dimple in communication with a reciprocating ball;
d) the ball lock assembly being mounted in each of the left vertical support and the right vertical support;
e) the left vertical support and the right vertical support each including a blind aperture to receive the ball when the collapsible step is folded; and
f) the bottom step including a dimple on a side of the bottom step to receive the ball when the collapsible step is open.

4. The collapsible step assembly of claim 3 further comprising:
a) the top step and the bottom step having a honey comb structure on a bottom thereof for strength; and
b) a third step being added to the collapsible step.

5. The collapsible step assembly of claim 4 further comprising:
a) a hitch insert cooperating with the step assembly to permit use on a different trailer hitch;
b) a bar and cotterpin assembly cooperating to secure step assembly within the trailer hitch;
c) the bar and cotterpin assembly supporting the collapsible step; and
d) the collapsible step facilitating entry of or leaving of a vehicle by a pet or a person.

6. In a vehicle requiring a high step to enter therein, the improvement comprising:
a collapsible step assembly being releasably secured to the vehicle;
the collapsible step assembly including a mounting means;
the mounting means being receivable by a trailer hitch;
the mounting means supporting the collapsible step assembly;
at least two collapsible steps for the collapsible step assembly communicating with the mounting means;
the at least two collapsible steps being movable from a closed position to an open position, and from the open position to the closed position;
the at least two collapsible steps including a top step and a bottom step;
the mounting means including a first part of a top hinge;
the top step including a second part of the top hinge;
a left vertical support and a right vertical support correcting the top step to the bottom step;
a first upper hinge rod connecting the first part of the top hinge and the second part of the top hinge;
a top first side plate and a top second side plate being connected to opposing sides of the top step;
a bottom first side plate and a bottom second side plate being connected to opposing sides of the bottom step;
a first lower hinge rod connecting the bottom first side plate and the bottom second side plate to the bottom step;
a first upper hinge rod connecting the first top side plate and the second top side plate to the top step;
a second upper hinge rod connecting the left vertical support and the right vertical support to the top step;
the second upper hinge rod connecting the first top side plate over the left vertical support to the top step and connecting the second top side plate over the right vertical support to the top step on opposing sides thereof;
a first lower hinge rod connecting the left vertical support over the first bottom side plate and the right vertical support to the bottom step at lower end thereof;
a first lower hinge rod connecting the left vertical support and the right vertical support to the bottom step at lower end thereof;
the first lower hinge rod connecting the left vertical support and the first bottom side plate to the bottom step;
the first bottom side plate being between the left vertical support and the bottom step;
the first lower hinge rod connecting the right vertical support and the second bottom side plate to the bottom step;
the second bottom side plate being between the right vertical support and the bottom step;
a fastener holding each end of the first upper hinge rod, the second upper hinge rod, the first lower hinge rod and the second lower hinge rod in a desired position;
a lever lock assembly and a ball lock assembly cooperating with the left vertical support and the right vertical support in order to provide for positioning the collapsible step;
the lever lock assembly fitting into the top step adjacent to the second upper hinge rod;
a centrally located spring with a spring cover for the lever lock assembly;
the spring cover cooperating a coupling shank on each side thereof;
each coupling shank cooperating with an end latch bolt of the lever lock assembly; and
a sliding bushing operably connecting to the spring in order to facilitate an opening and a closing of the step assembly.

7. The vehicle of claim 6 further comprising:
a) the sliding bushing having a finger lever extending therefrom to facilitate use thereof;
b) the sliding bushing having a coupling aperture;
c) the coupling aperture receiving a large compression spring; and
d) the ball lock assembly cooperating with the lever lock assembly.

8. The vehicle of claim 7 further comprising:
a) the ball lock assembly holding the step assembly in the open position or the closed position;
b) the ball lock assembly having a ball housing;
c) the ball housing containing a dimple in communication with a reciprocating ball;
d) the ball lock assembly being mounted in each of the left vertical support and the second vertical support;
e) the left vertical support and the right vertical support each including a blind aperture to receive the ball when the collapsible step is folded; and
f) the bottom step including a dimple on a side of the bottom step to receive the ball when the collapsible step is open.

9. The vehicle of claim 8 further comprising:
a) the top step and the bottom step having a honey comb structure on a bottom thereof for strength; and
b) a third step being added to the collapsible step.

10. The vehicle of claim 9 further comprising:
a) a hitch insert cooperating with the step assembly to permit use on a different trailer hitch;
b) the bar and cotterpin assembly supporting the collapsible step; and
c) the collapsible step facilitating entry of or leaving of a vehicle by a pet or a person.

* * * * *